P. M. OLSEN.
DEVICE FOR PLUMBING AND LEVELING.
APPLICATION FILED AUG. 4, 1910.
1,040,744.
Patented Oct. 8, 1912.
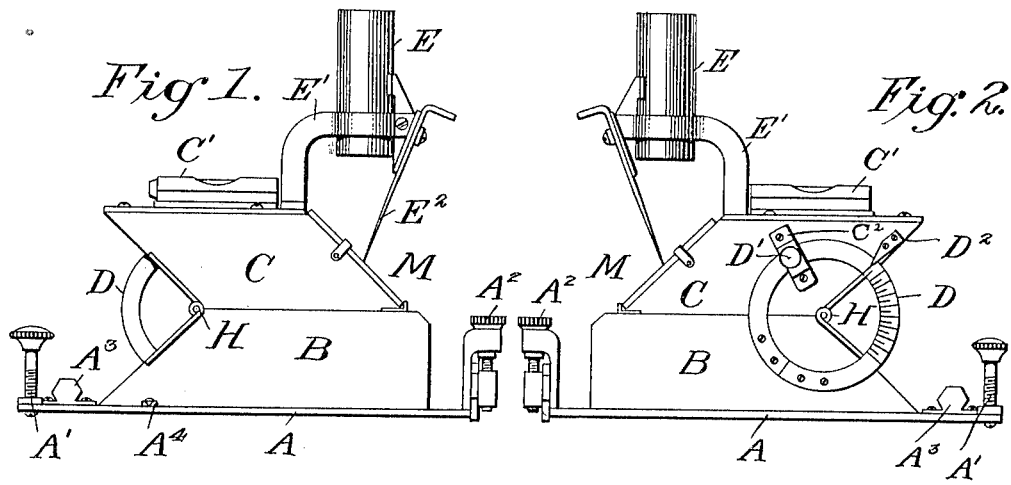
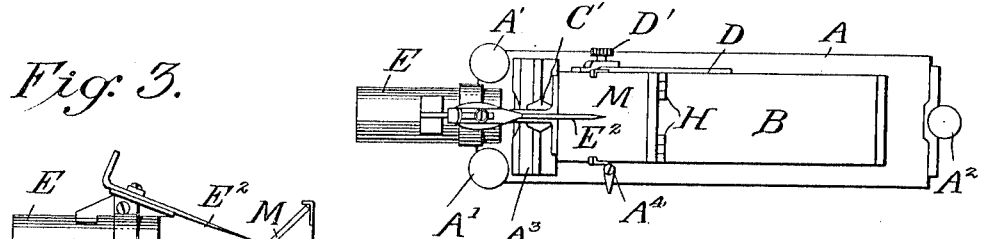
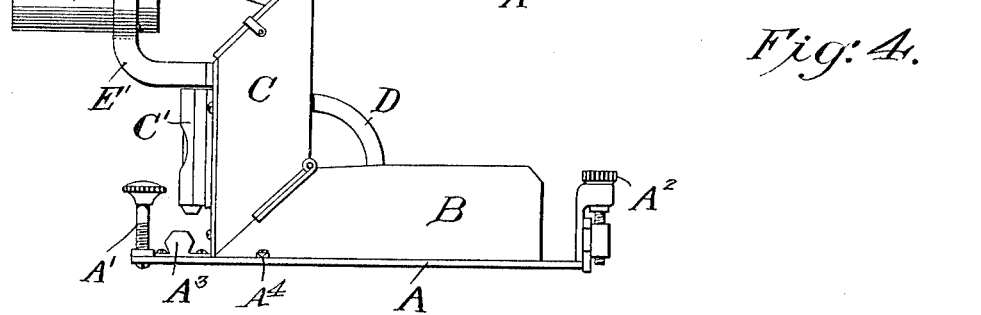
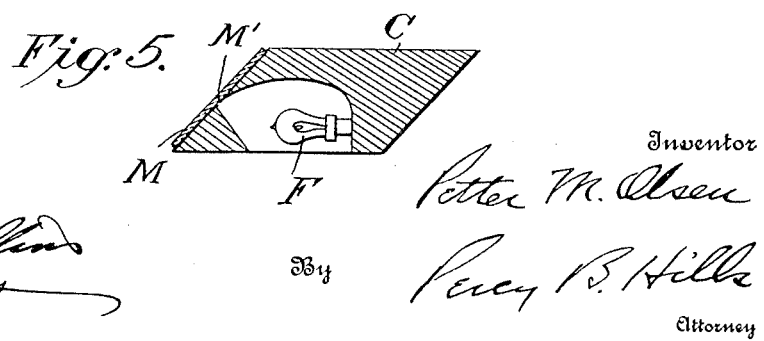

UNITED STATES PATENT OFFICE.

PETTER MARTIN OLSEN, OF BROOKLYN, NEW YORK.

DEVICE FOR PLUMBING AND LEVELING.

1,040,744.  Specification of Letters Patent. Patented Oct. 8, 1912.

Application filed August 4, 1910. Serial No. 575,405.

*To all whom it may concern:*

Be it known that I, PETTER MARTIN OLSEN, a citizen of the United States, and a resident of Brooklyn, county of Kings, and State of New York, have invented certain new and useful Improvements in Devices for Plumbing and Leveling, of which the following is a specification.

My invention relates to devices for plumbing and leveling, and has for its object to provide certain improvements in the construction of the same as will be hereinafter more definitely pointed out and claimed, reference being had to the accompanying drawing, in which:—

Figure 1 is a side elevation of my improved device when in position for leveling. Fig. 2 is a view similar to Fig. 1, taken from the opposite side. Fig. 3 is a side elevation of the device arranged for plumbing. Fig. 4 is a top plan view of the device in the position shown in Fig. 3. Fig. 5 is a detail longitudinal sectional view of the mirror block, showing a slightly modified construction.

Similar letters of reference denote corresponding parts in the several views.

In the said drawing the reference letter A denotes a plate forming a supporting base, the same being provided with screws $A'$ and $A^2$ at its ends for adjusting the level thereof. Fixed to said plate A is a member in the form of a block B, to which is hinged at H another member in the form of a block C. Spirit levels $A^3$ and $C'$ attached to plate A and block C respectively, and disposed at a right angle to each other, afford means for adjusting plate A and block B, through screws $A'$ and $A^2$, to level.

Fixed to one side of block B is a quadrant, and at $D'$ is a screw mounted in a bracket $C^2$ on block C adapted to engage said quadrant to hold said block C in any adjusted position, said quadrant being marked with a suitable scale, with which registers a pointer $D^2$ on block C to indicate the angle of block C with respect to block B.

Fixed to block C by arm $E'$ is a sight tube E, said arm also carrying a pointer $E^2$ in contact at its outer end with the surface of a mirror or reflecting surface M fixed to one end of block C at an angle to the center of tube E.

From the foregoing description the operation of the device in leveling will be understood as follows:—The plate A resting on a suitable supporting surface is adjusted to level by its screws $A'$ and $A^2$ and the levels $C'$ and $A^3$. Upon now looking through the tube E into mirror M a distant point that registers with the end of pointer $E^2$ which is against mirror M will be on a level with said pointer end; or if the distant point does not register with the pointer end, the two can be brought into register by shifting block C on its hinge H until they do, the angle of difference from the level being then indicated on the scale of the quadrant D by the pointer $D^2$.

For use in plumbing the blocks B and C are shifted to the relative positions shown in Figs. 3 and 4, and the device is placed on the floor or other surface with the adjusting screws $A'$, $A^2$, resting thereon, as seen in Figs. 3 and 4. The device being leveled, a sight is taken through tube E at a target placed near the top of the wall at the same distance from said wall as is the center of the device. If the wall is plumb, the target center will register with the end of pointer $E^2$, and if out of plumb the adjustment of block C to cause them to register will indicate on the scale on quadrant D by pointer $D^2$. To facilitate drawing a line perpendicular to plate A, a pointer $A^4$ is provided on said plate, which with the device in the position shown in Fig. 3 is in vertical alinement with the point of $E^2$.

In Fig. 5 I have shown a slight modification, for use in dark spaces. In said figure the block C is hollowed to receive a source of light, such as an electric lamp F, and said hollowed out portion extends to immediately beneath the mirror M, which latter is made transparent at $M'$ at the point $M'$ corresponding to where the end of pointer $E^2$ touches the same in Figs. 1 and 2, said pointer being dispensed with, and said illuminated spot serving as the guide, as will be readily understood.

Having thus described my invention, what I claim as new and desire to secure by Letters Patent is:—

1. In a plumbing and leveling instrument, members hinged to each other, means for adjusting one of said members to level, and a sight tube and a mirror mounted on the other member.

2. In a plumbing and leveling instrument, members hinged to each other, means for adjusting one of said members to level, a sight tube and a mirror mounted on the other member, and a scale and pointer on said members for indicating the angular relation of said members.

3. In a plumbing and leveling instrument, members hinged to each other, means for adjusting one of said members to level, a sight tube mounted on the other member, a mirror also mounted on said other member at an angle to the axis of said sight tube, and a source of light within said mirror member for illuminating a transparent spot on said mirror in line with the axis of said sight tube.

PETTER MARTIN OLSEN.

Witnesses:
JENNY CHRISTIANSEN,
J. SCHAEFER, Jr.

Copies of this patent may be obtained for five cents each, by addressing the "Commissioner of Patents, Washington, D. C."